United States Patent [19]

Kim

[11] Patent Number: 5,452,149
[45] Date of Patent: Sep. 19, 1995

[54] AUTOMATIC VIDEO-TAPE CASSETTE CHANGER FOR USE WITH A VIDEO CASSETTE RECORDER

[75] Inventor: Chang-Gyun Kim, Seoul, Rep. of Korea

[73] Assignee: Daewoo Electronics Co., Ltd., Seoul, Rep. of Korea

[21] Appl. No.: 109,601

[22] Filed: Aug. 18, 1993

[30] Foreign Application Priority Data

Aug. 18, 1992 [KR] Rep. of Korea ............... 92-14840

[51] Int. Cl.[6] .............................................. G11B 15/18
[52] U.S. Cl. .......................................... 360/71; 360/92
[58] Field of Search ................. 360/92, 69, 15, 71; 369/34, 36, 39

[56] References Cited

U.S. PATENT DOCUMENTS

| | | | |
|---|---|---|---|
| 4,072,991 | 2/1978 | Kok | 360/92 |
| 4,092,685 | 5/1978 | Sander et al. | 360/92 |
| 4,636,888 | 1/1987 | Sidebottom | 360/92 |
| 4,807,066 | 2/1989 | Imazaike | 360/92 |
| 4,835,634 | 5/1989 | Ostwald | 360/92 |
| 5,050,019 | 9/1991 | Koyama et al. | 360/92 |
| 5,274,516 | 12/1993 | Kakuta et al. | 360/92 |
| 5,276,558 | 1/1994 | Hanson | 360/15 |

*Primary Examiner*—Andrew L. Sniezek
*Attorney, Agent, or Firm*—William F. Pinsak

[57] ABSTRACT

An improved control device for use in an automatic video tape cassette changing apparatus is adaptive to various types of the video cassette recorders. The control device is capable of sequentially changing a plurality of cassettes in a convenient and reliable manner in a video cassette recorder. The control device include the sensors 52, 53, 54, 55, 56, the microprocessor 51 and the drive circuit for actuating the mechanical components. The microprocessor includes a first control mode responsive to the cassette detection signals from the sensor 54 and 56 for sequentially actuating the drive circuits 21, 36 and 39, and a second control mode responsive to the cassette detection signals from the sensors 53 and 56 for sequentially actuating the drive circuits 36, 39 and 41.

1 Claim, 15 Drawing Sheets

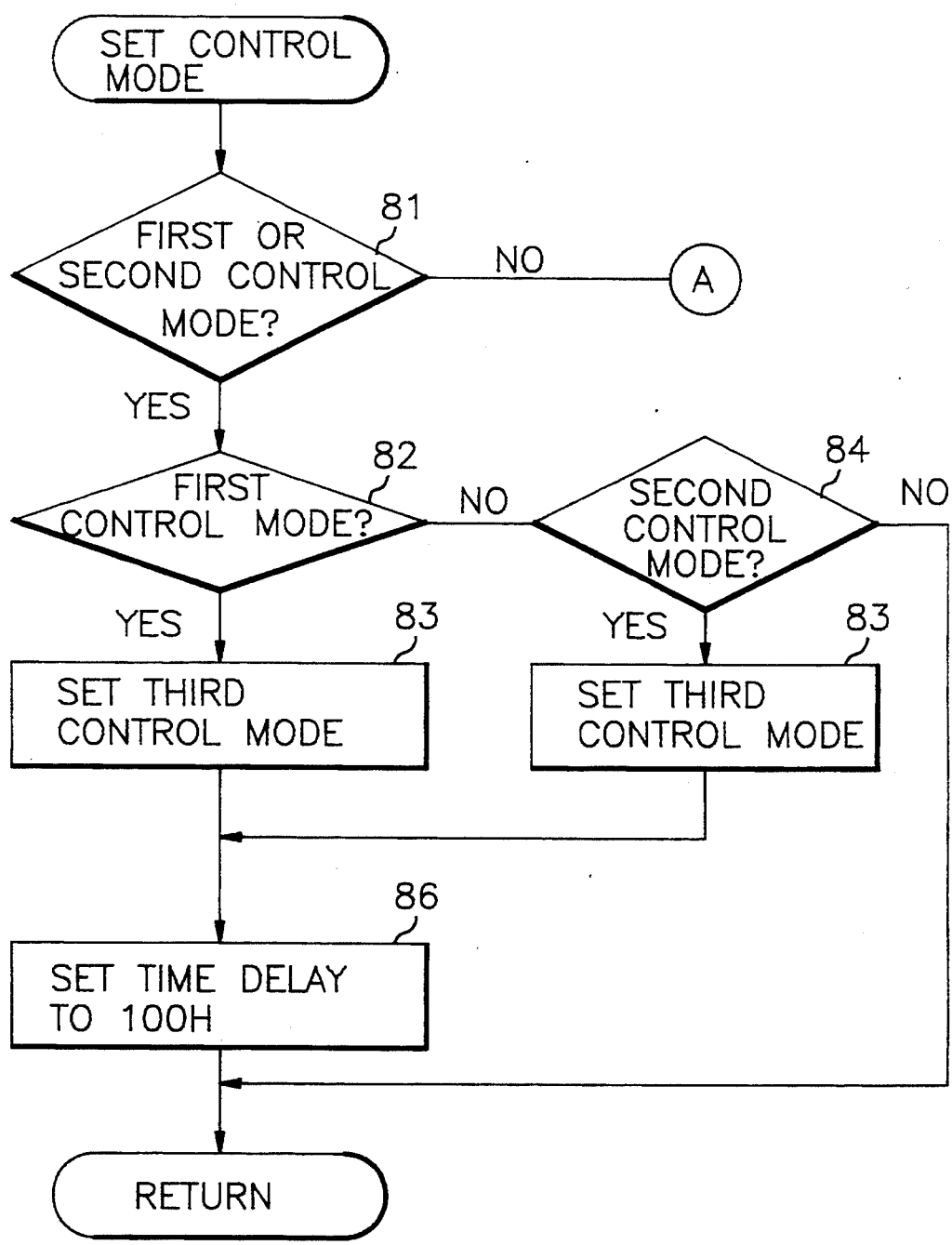

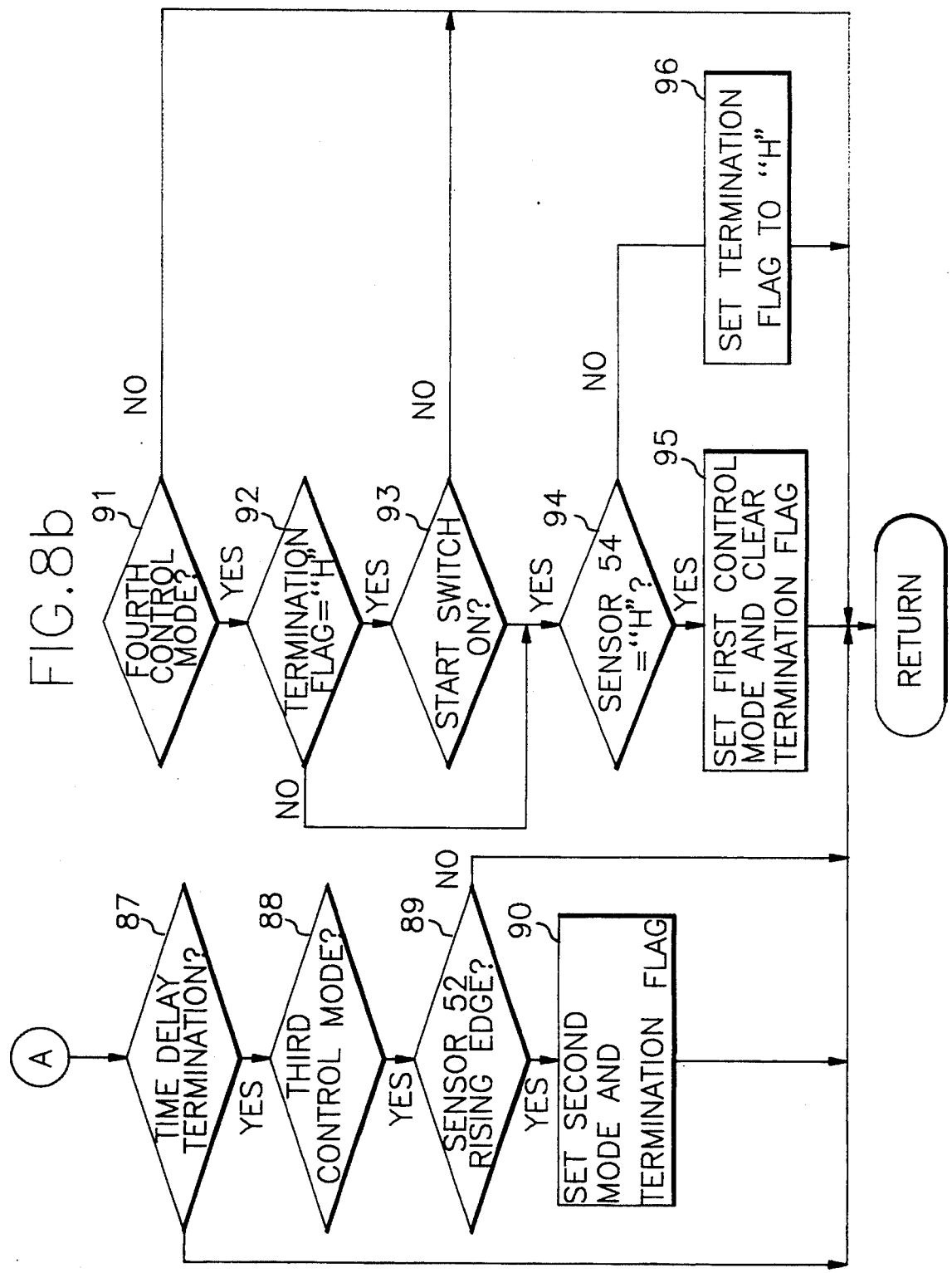

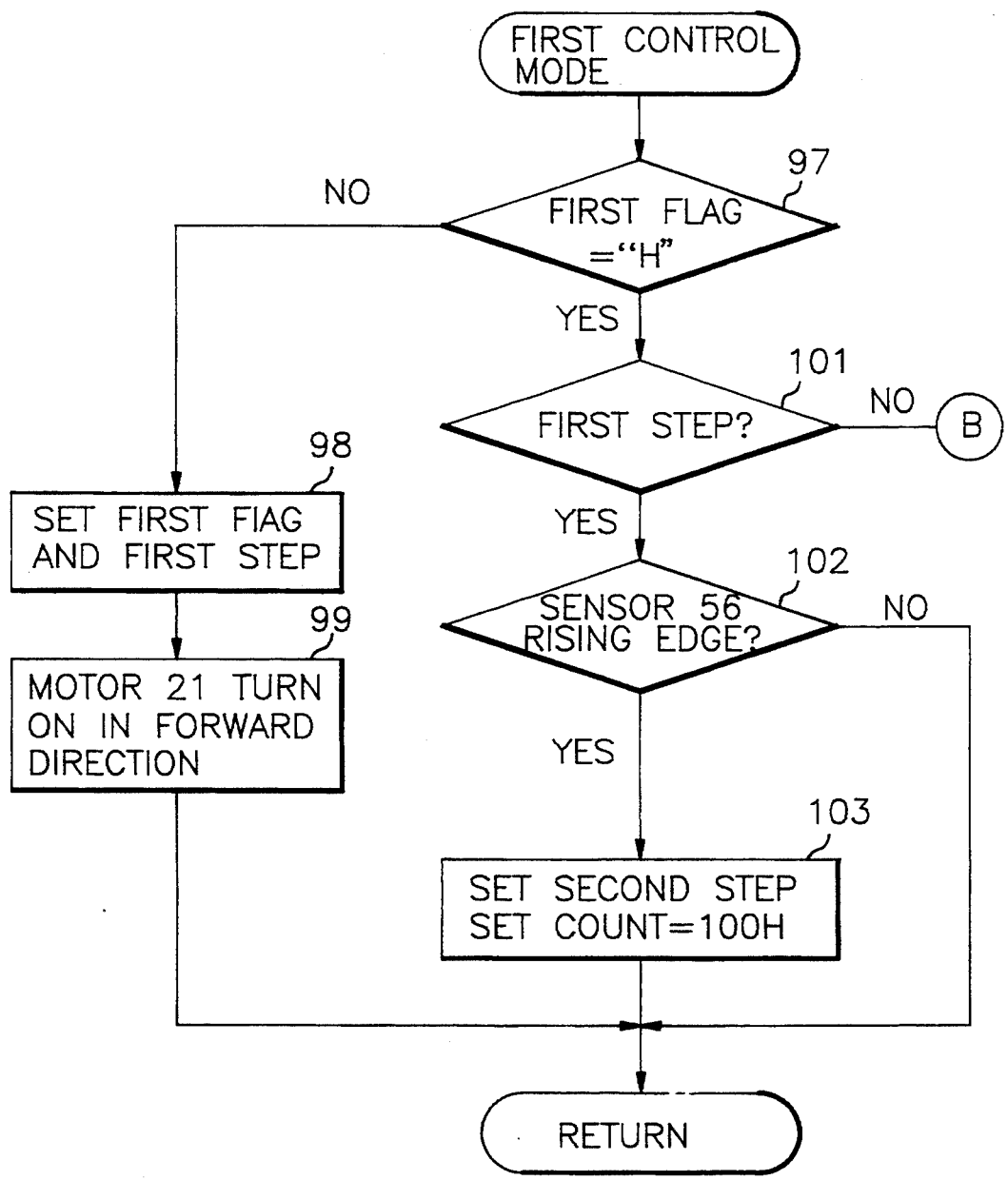

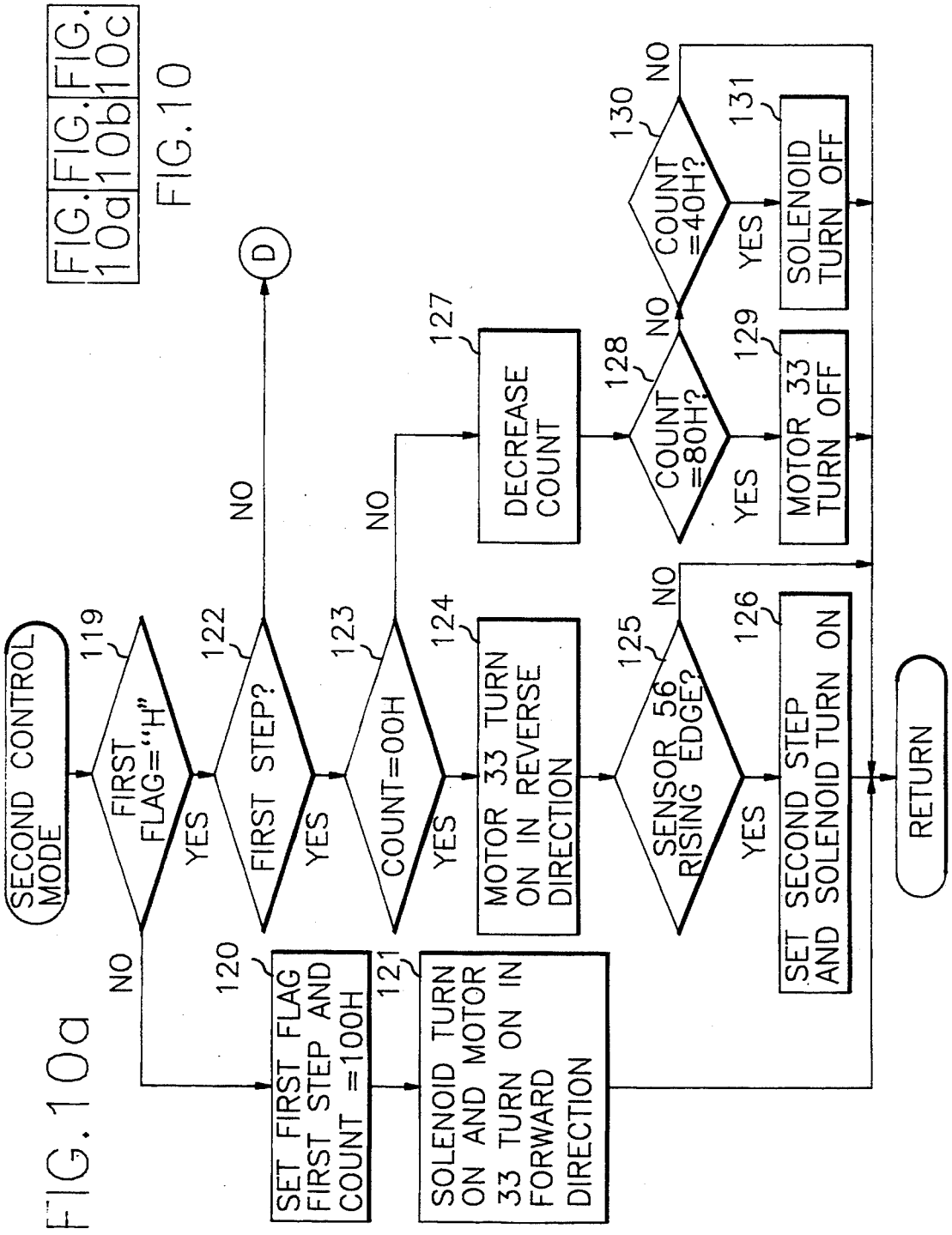

AUTOMATIC VIDEO-TAPE CASSETTE CHANGER FOR USE WITH A VIDEO CASSETTE RECORDER

FIELD OF THE INVENTION

The present invention relates to a control device adapted to be used in a video tape cassette changer; and, more particularly, to an improved control device for video tape cassette changer compatible with any video cassette recorder ("VCR") of front loading type, which is capable of automatically controlling mechanical components of the video-tape cassette changer independent of the control of VCR and feeding and serially a number of cassettes to and extracting them from a VCR during the recording or reproduction operation in a reliable and convenient manner.

DESCRIPTION OF THE PRIOR ART

In general, a cassette changing device has been used for recording or reproducing a number of cassettes in a VCR. In particular, such a cassette changing device is of great use in cable TV networks, video recording/reproducing operators and the like, because it can change automatically a plurality of cassettes without any extra manual labor of the operator.

One example of such automatic cassette changers is disclosed in U.S. Pat. No. 4,072,991 and 5,050,019, which comprises a feed-in magazine for storing a number of cassettes, a feed-out magazine arranged to adjoin the feed-in magazine for storing a number of cassettes removed from a tape recorder, and a cassette pusher for pushing the lowermost cassette in the feed-in magazine under the stack of cassettes into the feed-out magazine. However, since the cassette changing device is designed to exclusively replace audio-tape cassettes, it cannot be employed to change a plurality of video-tape cassettes. In addition, the manufacturing cost of the control device is relatively high as it is made in a rather complicated mechanical structure.

A typical video-tape cassette changing apparatus known in the art comprises a magazine detachably mounted in a VCR, a conveyer for supplying serially a number of video cassettes stored in the magazine to the VCR for playing or recording the video cassette, and means for ejecting played or recorded cassettes from the VCR to discharge them out of the magazine. However, such proposed automatic cassette changing apparatus, the timing and occurrence of the series of the operations required for automatically exchanging cassettes in the associated VCR are controlled in a purely mechanical manner and without effecting overall system control. Further, it is difficult to achieve repeated operation independent of the control of the associated VCR.

SUMMARY OF THE INVENTION

Accordingly, an object of the present invention is to provide an improved control device for use in an automatic video tape cassette changing apparatus which is adaptive to various types of the VCR's.

Another object of the invention is to provide an control device for an automatic videotape cassette changing apparatus, which is capable of sequentially changing a plurality of cassettes in a convenient and reliable manner in a VCR.

The above and other objects of the present invention are accomplished by an improved control device for use in an automatic video tape cassette changing apparatus adapted to be used with a VCR. The automatic changing apparatus comprises a main body having a rectangular-shaped open space in which a plurality of cassettes are to be dropped, a cassette entering inlet located in the vicinity of and parallel to an access opening of the VCR, and a cassette discharging outlet through which a cassette is discharged outwardly; a cassette feeding device for dropping the cassettes one at a time; a inserting and extracting device for inserting and extracting the dropped cassette into and from the access opening of the VCR; and a discharging device for discharging the cassette extracted from the VCR through the cassette discharging outlet outwardly. The control device comprises: an eject sensor for detecting a recorded or reproduced cassette ejected from the VCR and generating a first cassette detection signal; a stack sensor for detecting the lowermost one of the stacked cassettes and generating a second cassette detection signal; a discharge sensor for detecting a cassette discharging therethrough and generating a third cassette detection signal; a feed sensor for detecting the dropped cassette and generating a fourth cassette detection signal; a first drive means for driving the cassette feeding device; a second drive means for driving the inserting and extracting device; a third drive means for driving the discharging device; and a microprocessor means responsive to the first, the second, the third and fourth cassette detection signals for sequentially actuating the first, the second, and the third drive means.

BRIEF DESCRIPTION OF THE DRAWINGS

The above and other objects, advantages and features of the present invention will be apparent from the following descriptions, taken in conjunction with the accompanying drawings, wherein.

Figure 7:
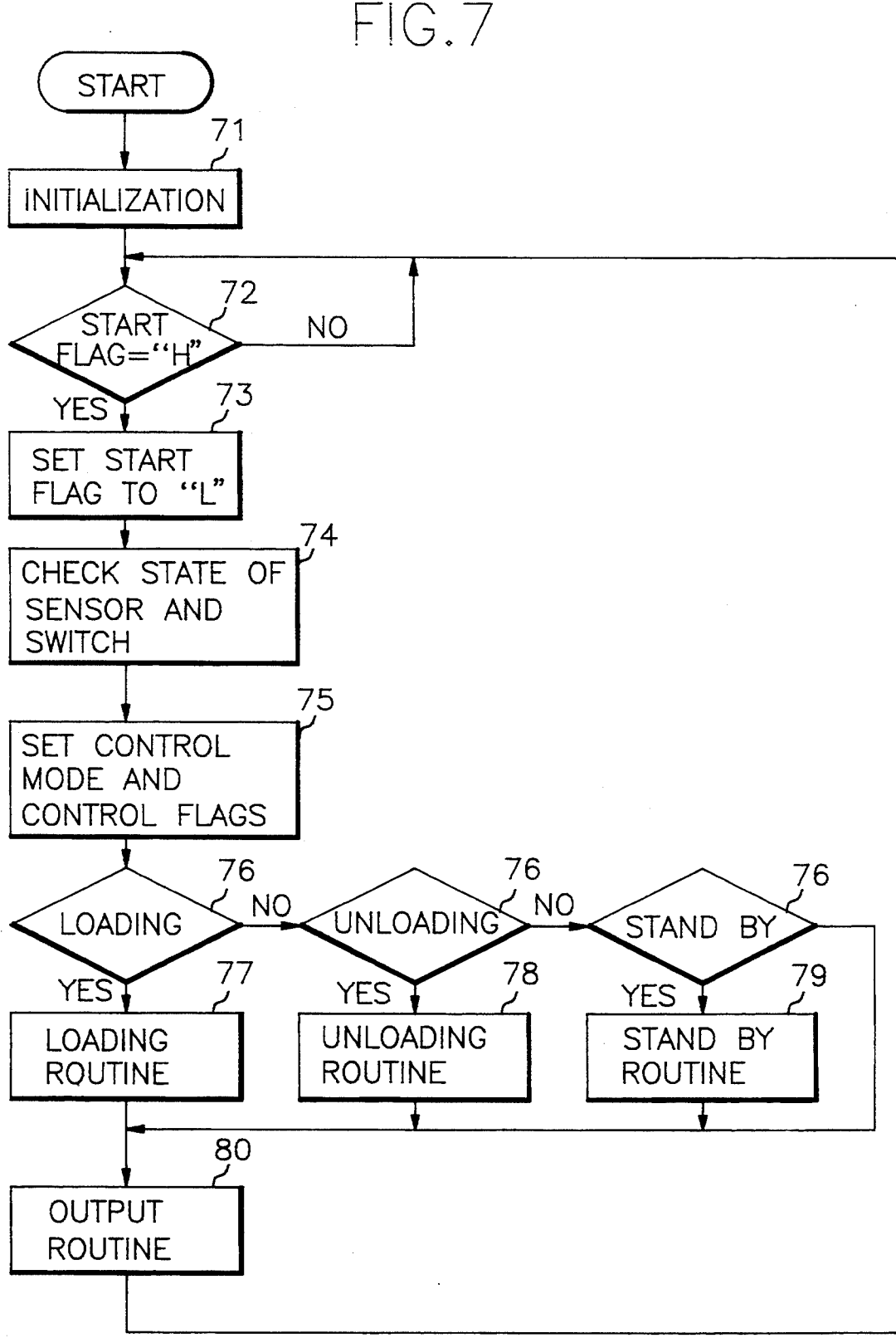
FIG. 7 is a flow chart showing operation of the control device depicted in FIG. 5.

FIGS, 8, 8a and 8b are flow charts depicting step 75 shown in FIG. 7;

FIGS. 9, 9a, 9b and 9c are flow charts illustrating the loading routine i.e., the first control mode; and FIGS. 10, 10a, 10b and 10c are flow charts the unloading routine, i.e., the second control mode.

DETAILED DESCRIPTION OF THE PREFERRED EMBODIMENT

Figure 1:
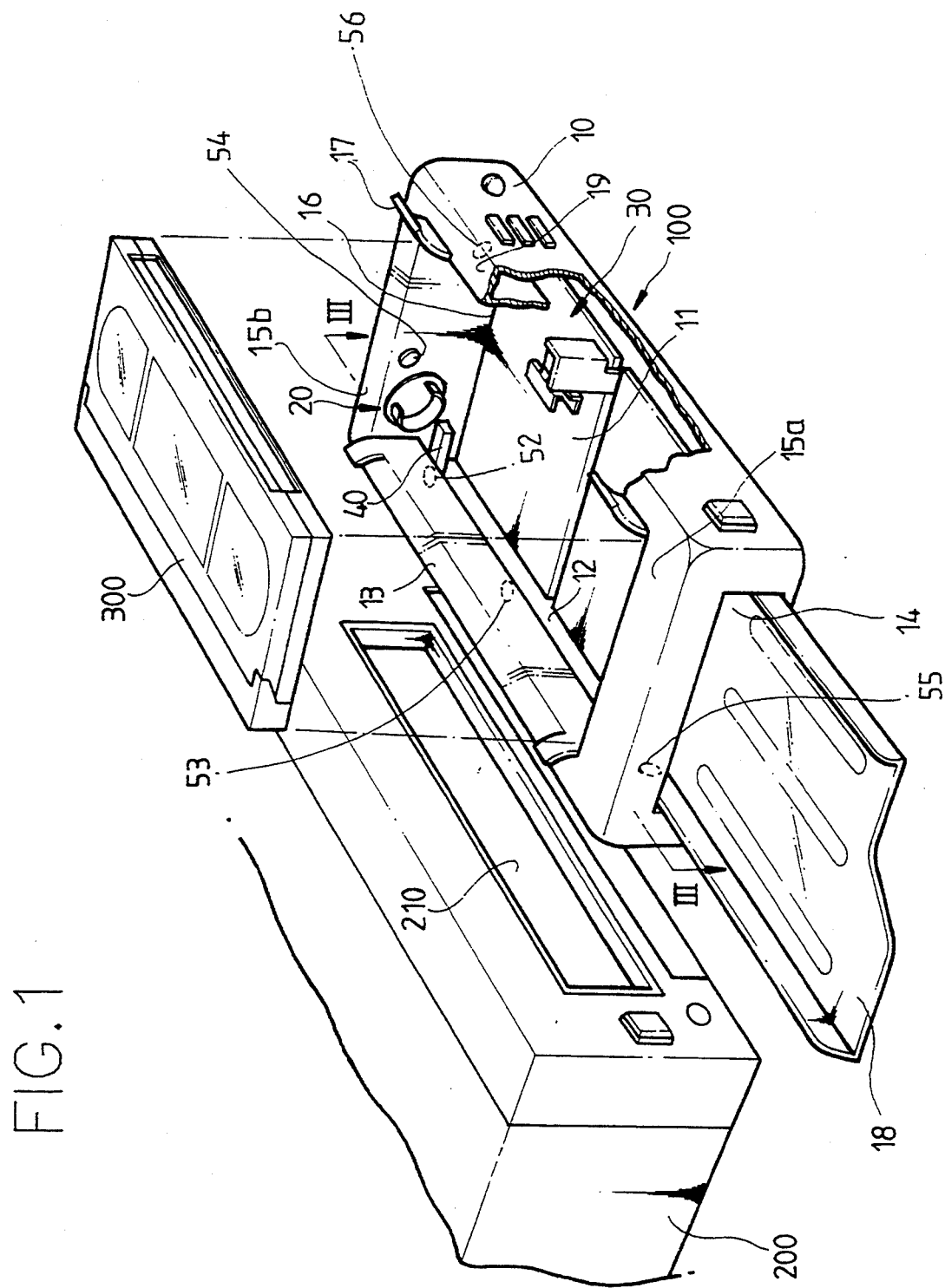
FIG. 1 is a simplified perspective view of a preferred embodiment of the cassette changing apparatus employing the present invention.

Referring to FIG. 1, there is shown a preferred embodiment of an automatic cassette changing apparatus 100 employing the present invention, which is adapted to be used in combination with a VCR 200 of front loading type. The cassette changing apparatus 100 comprises a main body 10, a cassette feeding device 20 for sequentially dropping the cassette into the changing apparatus 100, an inserting and extracting device 30 for moving the cassette into and away from the access opening 210 of the VCR 200, and a cassette discharging device 40 for discharging the cassette outward.

As shown, the main body 10 includes a rectangular-shaped open space 11 formed therein for receiving one or more video-tape cassettes 300, a cassette entering inlet 12 provided at a rear wall 13 of the main body 10 and communicating with the open space 11 and a cassette access opening 210 of the VCR 200, a cassette discharging outlet 14 formed at a side wall 15a of the main body 10 and communicating with the open space 11 for discharging recorded or reproduced cassettes ejected from the VCR 200.

Preferably, the cassette entering inlet 12 is arranged at the bottom surface 16 of the main body 10 adjoining the open space 11 in a coplannar relationship with each other so as to facilitate the insertion of the cassette 300 into the cassette access opening 210 of VCR 200. Provided at top edges of the main body 10 adjoining the open space 11 are outwardly bent strip 17 adapted to guide the downward movement of the cassette 300. Receptacle 18 is attached to the cassette discharging outlet 14 to receive the cassette ejected from the VCR 200 through the main body 10.

Figure 2:
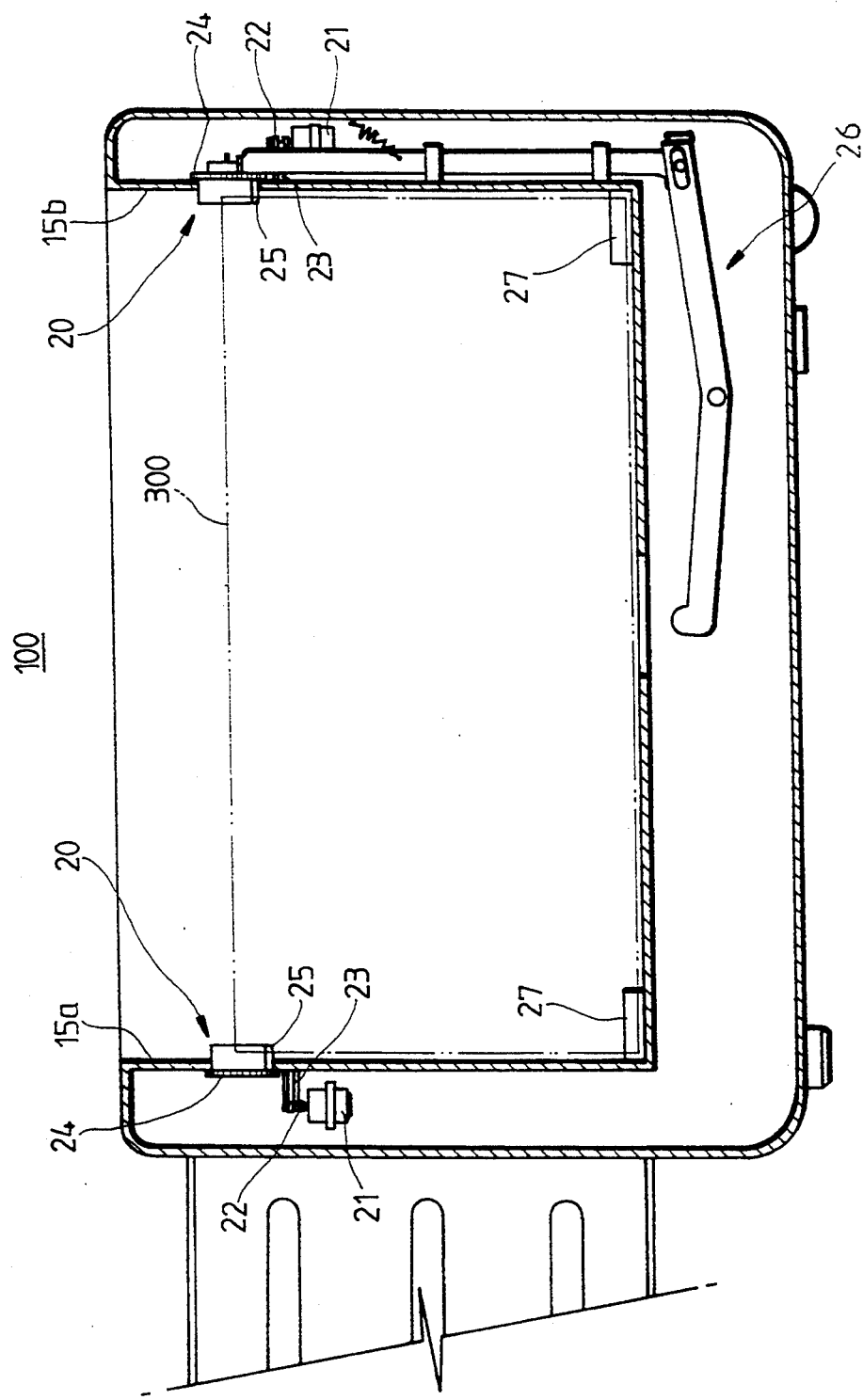
FIG. 2 is a sectional view taken along line III—III of FIG. 1.

Referring to FIG. 2, the cassette feeding device 20 of the cassette changing apparatus 100 shown in FIG. 1 is shown. The feeding device 20 serves to drop serially one by one a number of cassettes on the bottom surface 16 of the main body 10 for supplying them to the VCR 200. The cassette feeding device 20 includes a driving gear 22 driven by motors 21, an intermediate gear 23 engaged with the driving gear 22, a driven gear 24 meshed with the intermediate gear 23 and a cutout cylinder holder integrally formed at one side of the driven gear 24. The cassette feeding device 20 is actuated synchronously by the motors 21. Preferably, the feeding device 20 may be driven by a common motor instead of the individual motor. The cylinder holder 25 has a quarter cutout portion adapted to support and grip a rear edge of the cassette 300.

As shown in FIG. 2, associated with one of the cassette feeding device 20 is a cassette pushing means 26 for assisting the dropping movement of the cassettes 200. That is, the cassette pushing refer functions to push the lowermost one of the stacked cassettes supported on the projecting pieces 27 of the front wall 19 of the main body 10 (shown in FIG. 1) and to separate it from the stacked cassette during the exchanging operation of cassettes.

Figure 3:
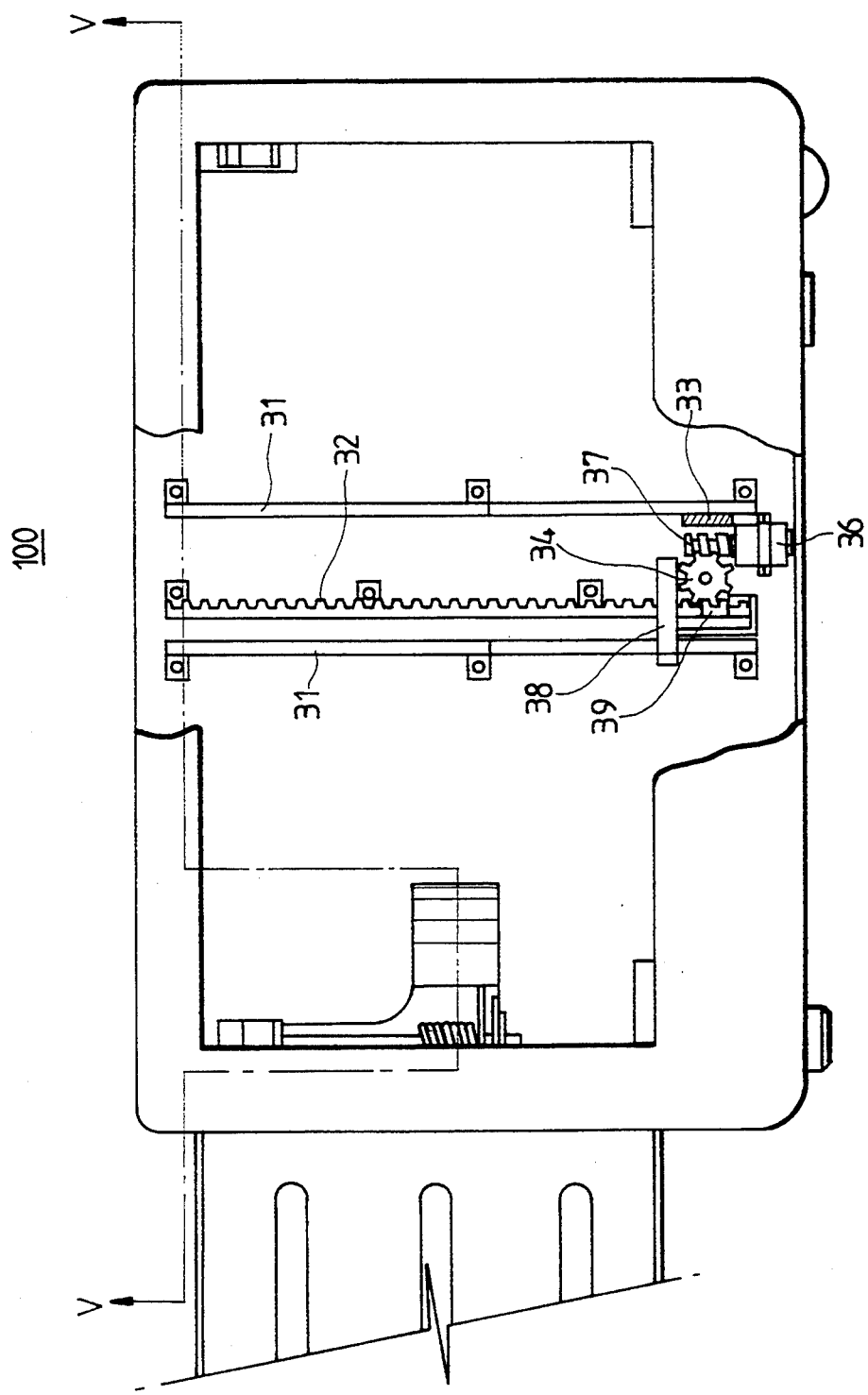
FIG. 3 is a plan view of the automatic videotape cassette changing device of FIG. 1, partially broken away for illustrating a preferred embodiment of the inserting and extracting device.

Referring to FIG. 3, the inserting and extracting device 30 is mounted at the center of the bottom surface 16 of the changing apparatus 100. A pair of guide rails 31 and a rack gear 32 are mounted on the bottom surface of the changing apparatus 100, a sliding carrier 33 (dash line) is slidably mounted on the guide rails 31, and a pinion (not shown) and a worm wheel 34 are engaged with the rack gear 32 and a worm 37 of an electrical motor 36, respectively.

The inserting and extracting device 30 comprises a gripper 38 for gripping the cassette, and a solenoid value 39 for actuating the gripper 38. The sliding carrier 33 on which the gripper 38 and the solenoid value 39 are mounted, is reciprocated toward and away from the access opening by means of the motor 36. This is, the rotation of the electric motor 36 cause the worm 37 to drive the worm wheel 34 and pinion, thereby allowing a movement of the pinion along the rack gear 32 and leading to a sliding movement of carrier 33 along the guide rails 31.

When a cassette is dropped into the changing apparatus 100, the gripper 38 closed by an actuation of solenoid value 39 pushes the cassette and then a rotation of the electric motor makes the carrier 33 move toward the access opening of the VCR 200 shown in FIG. 1 so that the cassette is inserted into the VCR 200. In order to prevent an interference from the leading edges of the jaw and edges of the access opening 210 when the cassette is inserted, the height of the closed gripper 38 is preferably smaller than that of the access opening 200. After the cassette has been inserted, the gripper is opened by the actuation of the solenoid value 39 and remains open until the cassette is ejected.

When the cassette ejected from the VCR 200 and the gripper 38 grips the cassette. Then, the carrier is removed away from the access opening 210 to replace the cassette with in the changing device. In order to increase the gripping power of the jaws during the extraction of the cassette, elastomeric sheet materials may be attached to the inner surfaces of the jaws.

Figure 4:
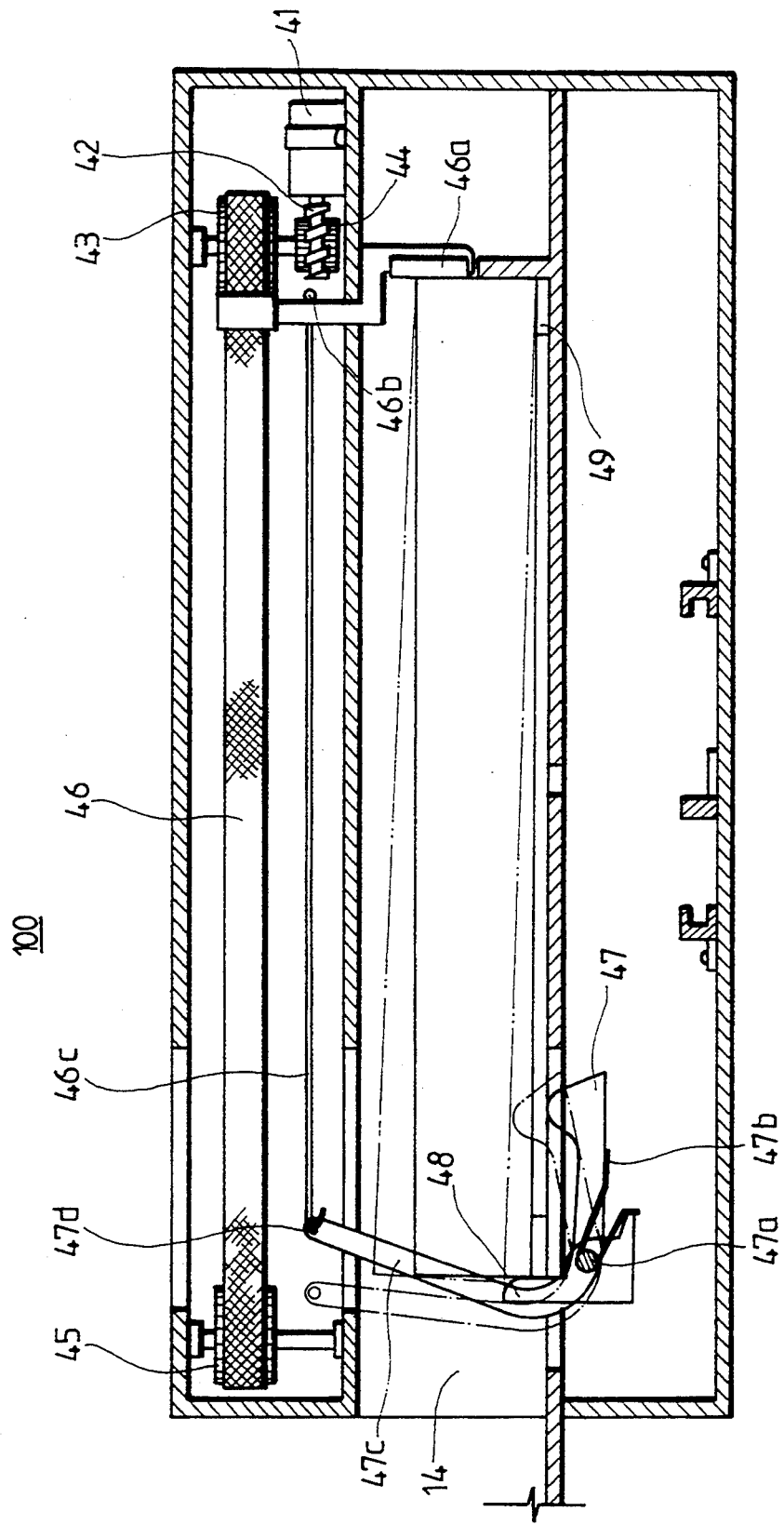
FIG. 4 is a cross-section taken along line V—V of FIG. 3.

Referring to FIG. 4, the discharging device 40 is shown, which is installed in a rear part of the changing apparatus 100, and comprises an electric motor 41 having a shaft with a worm 42, a first timing gear 43 and a worm wheel 44 engaged with the worm 42 and rotatably fixed to the inner wall of the changing apparatus 100, a second timing gear 45 located opposite to the first timing gear 45 and rotatably fixed to the inner wall of the changing apparatus, a timing belt 46 engaged around the two gear 43 and 45, and a tongue 47 mounted between a pair of thresholders 48 formed on the bottom surface of the cassette discharging outlet 14. The pair of thresholders aligns the cassette with the access opening 210 during the insertion and extraction of the cassette. A plurality of protrusions 49 formed on the bottom surface of the changing device provides a gap which allows the gripper 38 shown in FIG. 3 to grip the cassette. The tonque 47 is pivotally fixed to hinge 47a, and upwardly biased by a torsion spring 47b. The tongue 47 has an elongated lever 47c connected to the movable member 46a by a wire 46b at its free end 47d. The other end of the wire 46b having a hook member 46b is inserted through an aperture (not shown) formed in the movable member 46a.

The electric motor 41 is driven to rotate the belt 46 and the movable member 46a fixed to the timing belt 46 can be moved therewith. The tongue 47 is upwardly biased to a position illustrated in phantom lines to raise the cassette as the movable member 46a moves in the direction of an arrow. Thus, the cassette, so raised, is able to go over the thresholds 48, and, then, a further movement of the movable member 46a lead to the discharge of the cassette through the cassette discharging outlet 14. Upon completion of discharge of the cassette, the movable member returns to its home position and the tongue 47 is relocated to a position illustrated in solid lines, and, a subsequent cassette changing operation is ready to be performed.

Figure 5:
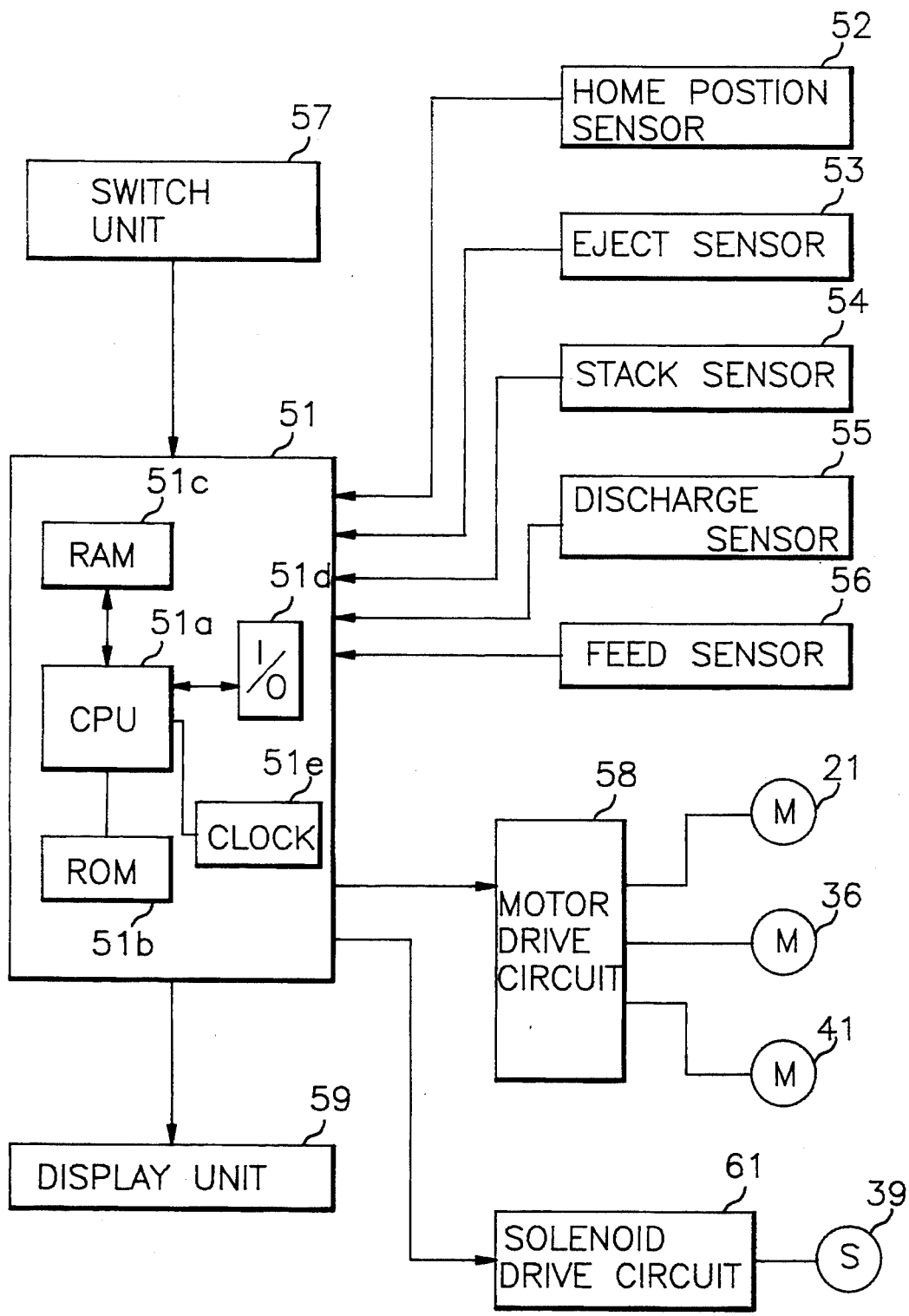
FIG. 5 is a schematic diagram of a control device in accordance with the present invention, which is preferably employed in the cassette changing apparatus shown in FIG. 1.

Referring now to FIG. 5, a control device in accordance with the present invention is shown, which is preferably employed in the cassette changing apparatus shown in FIG. 1. The control device 50 comprises a microprocessor 51, sensors 52, 53, 54, 55, and 56, a switch unit 57, a motor driving circuit 58, a display unit 59 and solenoid driving circuit 61.

A microprocessor 51 programmed by firmware in ROM 51b to execute various sensing and control functions hereinafter described to carry out alternative operations to provide continuous cassette changing operation. The microprocessor 51, which is conventional, is provided with a number of components such as a random access memory (RAM) 51c, a clock 51e and an I/O port 51d in standard microprocessor architecture.

The firmware stored in ROM 51c includes program instruction, or OP code, within one address zone of the ROM, to control the CPU 51a to operate in the manner to be described in detail below. Also stored in ROM are a number of fixed control parameters that are read by the CPU 51a upon the monitor of the sensors and the switch unit to control the cassette changing apparatus for the continuous changing operation. In the preferred embodiment, the ROM contains as a stored parameter.

The microprocessor 52 monitors successively the input devices such as: a home position sensor 52 attached on the rear wall 13 of the cassette changing apparatus to detect a home position of the cassette discharging device and generates a home position detection signal; an eject sensor 53 attached on the bottom surface near the cassette entering inlet 12 to detect a recorded or reproduced cassette ejected from the VCR and generates a first cassette detection signal; a stack sensor 54 attached on the side wall 15b of the cassette changing apparatus to detect the lowermost one of the stacked cassettes and generates a second cassette detection signal; a discharge sensor 55 attached on the cassette discharging outlet 14 to detect a cassette discharging therethrough and generates a third cassette detection signal; a feed sensor 56 attached on the side wall 15b near the bottom surface 17 of the cassette changing apparatus and generates a forth cassette detection signal; and the switch unit 57 including a number of manually operable switches such as a start switch, a mode selection switch and the like.

It is well known that the aforementioned sensors can easily be implemented in the known manner using a photo-electric sensor.

There is also provided a display unit 59 connected to the microprocessor 51 to indicate various operation states. The microprocessor 51 generates an output to a display unit 59, located in a position convenient to service personnel and preferably visible to the user, to provide an alarm requesting manual operation and indicate the control mode.

Receiving the output signal from the aforementioned switch unit 57 and the sensors 52, 53, 54, 55 and 56, the microprocessor 51 controls the feeding motor 21 for driving the cassette feeding device 20, the insert/extract motor 36 for driving the inserting and extracting device 30, and the discharge motor 41 for driving the cassette discharging device 40 the by means of the motor drive circuit 58. The microprocessor 57 also controls the solenoid valve 39 through the use of the solenoid drive circuit 61. It should be appreciated that the motor drive circuit 58 and the solenoid drive circuit is readily implemented by conventional drive circuits, respectively.

Figure 6:
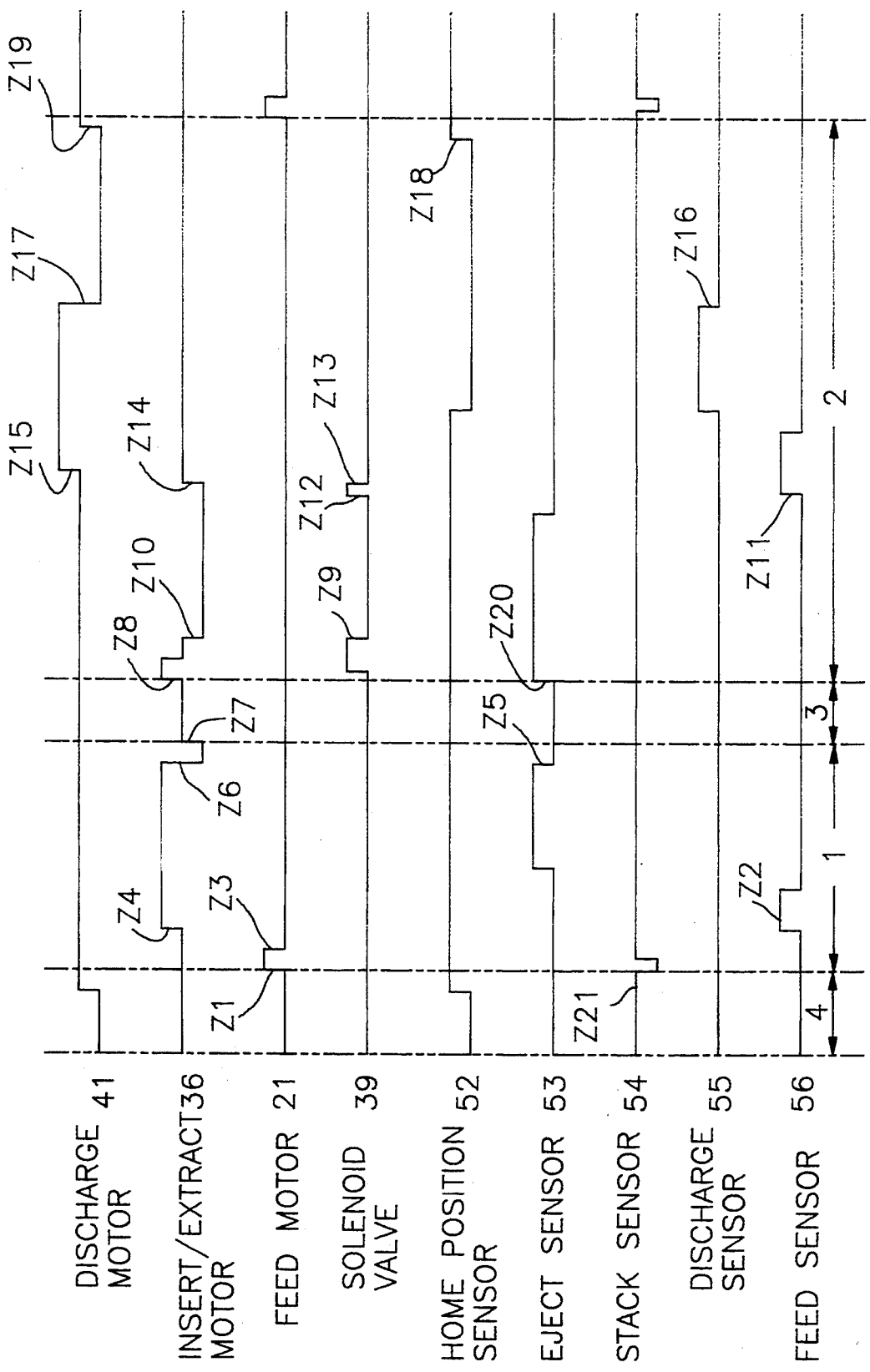
FIG. 6 is a timing chart illustrating operation of the control device shown in FIG. 5.

Referring to FIG. 6, a timing chart illustrating operation of the control device shown in FIG. 5, control device has a first, second, third and fourth control mode C1, C2, C3 and C4.

In the first control mode C1, the microprocessor 51 is responsive to the output from the stack sensor 54 to energize the feed motor 21 through the use of the motor drive circuit 58, and is responsive to the output from the feed sensor 56 to deenergize the feed motor 21 and energize the insert/extract motor 36 after a predetermined time interval. The microprocessor 51 is then responsive to the output from the eject sensor 53 to energize the insert/extract motor 36 in reverse direction. Therefore, one of the stacked cassettes is dropped onto the bottom surface 16 of the cassette changing apparatus 100 by the rotation of the cassette feeding device and then the dropped cassette is inserted into the access opening 210 of the VCR 200 by the forward drive of the inserting and extracting device 30. After the cassette is inserted, the inserting and extracting device 30 is positioned at a predetermined distance from the access opening by the reverse drive of the insert/extract motor 36, thereby allowing the speedily extracting operation.

In the second control mode C2, the microprocessor 51 is responsive to the eject sensor 53 to energize the insert/extract motor 36 in the forward direction and the solenoid, simultaneously. When the ejected cassette is gripped by the deenergization of the solenoid valve 39, the insert/extract motor 36 is energized in the reverse direction. The microprocessor 51 is then responsive to the output from the feed sensor 56 to energize the solenoid for a predetermined time interval and deenergize the insert/extract motor 36, and the discharging motor 41 is energized in forward direction. When the output of the discharge sensor 55 is monitored, the discharge motor 41 is energized in reverse direction in the control device serves to actuate the inserting and extracting device to cause cassette ejected from VCR to unload from VCR and to actuate the cassette discharging device to allow the recorded or reproduced cassette to be discharged outward of the cassette exchanging device.

In the third control mode, the control device serves to monitor the third sensor and proceed the second control mode when raising edge of the third cassette detection signal is occurred.

In the fourth control mode, the control device serves to monitor software flag for repeating the aforementioned control mode or the standby an input of the start switch when the flag state set to "1" or a start signal from the start switch, this control mode switches to the first control mode responsive to the first cassette detection from the first sensor.

It should be appreciated that aforementioned control mode may be sequentially performed by firmware stored in ROM. The microprocessor is programmed to operate in manner described in the flow chart of FIGS. 7-9, to be described in combination with FIG. 6.

With reference now to FIG. 7, the microprocessor is controlled by firmware in ROM to execute an initialization routine (step 71) wherein software flags and software timers is reset. Any component faults identified during a previous program execution cycle are transferred to display unit 59 to provide a visual indication to the user.

In step 72, the processor determines whether or not the start flag, which indicates the requirement of control start, is logic "H". If the start flag is logic "H", the program goes to step 73 and if not, step 72 is repeated. The start flag is set to logic "H" once each predetermined time interval e.g., preferably 5 ms so that the remaining program steps are executed once each 5 ms. The start flag is then cleared by the program as logic "L" (step 73).

In step 74, the program sequentially monitors input signals from the sensors 52, 53, 54, 55 and 56 and the switch unit 57. The current state of the sensors is read twice to determined whether the input signal from the sensor is electrically noisy, thereby allowing the program to maintain the reliability of control. The monitored current state of the sensor is compared with the previous state of the sensor so that the transient state of the sensor i.e., "rising edge" and "falling edge" is detected.

Reading the state of the sensors 52, and 54, the state of the switch unit 57 and the software flags, the program determines the current control mode to be execute (step 75). Then, the selected control mode is executed by the loading routine (i.e., first control mode), the unloading routine (i.e., second control mode) or standby routine (i.e., third or forth control mode) (step 76, 77, 78, and 79).

In step 80, the results from the execution of the routine indicated in steps 77, 78 or 79 is transferred to the drive circuit 58 and 61, and the display unit 59 through the I/O port 51d. When the output routine 80 is completed, the program returns to step 72, and step 73 to 80 is repeated until the cassette changing apparatus is deenergized.

Referring to FIG. 8, step 75 shown in FIG. 7 is disclosed. In FIG. 8a, the program determines whether or not the current control mode is the first control mode or the second control mode (step 81). If the current control mode is the first control mode and the drive termination flag is set to logic "H", the current control mode is switched to the third control mode (step 82 and 83). If the current control mode is the second control mode and the drive termination flag is logic "H", the current control mode is changed to the forth control mode (step 84 and 85). As both are referred to the standby state, the time delay of the program is set to 100 H (step 86).

In FIG. 8b, if the current control mode is neither the first control mode nor the second control mode, the program determines whether or not the time delay set by step 86 is terminated. If the time delay is completed and the current control mode is the third control mode, the current control mode is set to the second control mode and the termination flag is set to logic "H" in response to the rising edge of the sensor 52 (Z20 of FIG. 6) (step 88, 89 and 90). If the time delay is completed and the current control mode is the fourth control mode, the program determines that the termination flag is not logic "H" or the input from the start switch is raised (step 92 and 93). When the termination flag is not logic "H" or the start switch is turned on, the current control mode is set to the first control mode and the termination flag is cleared as logic "L", in response to the logic "H" state of the sensor 54 (Z21 of FIG. 6) (step 94 and 95). In the forth control mode, although the termination flag is logic "L" and the start switch is turned on, the termination flag is set to logic "H" when the state of the sensor 54 is logic "L" (step 96).

Figure 9B:
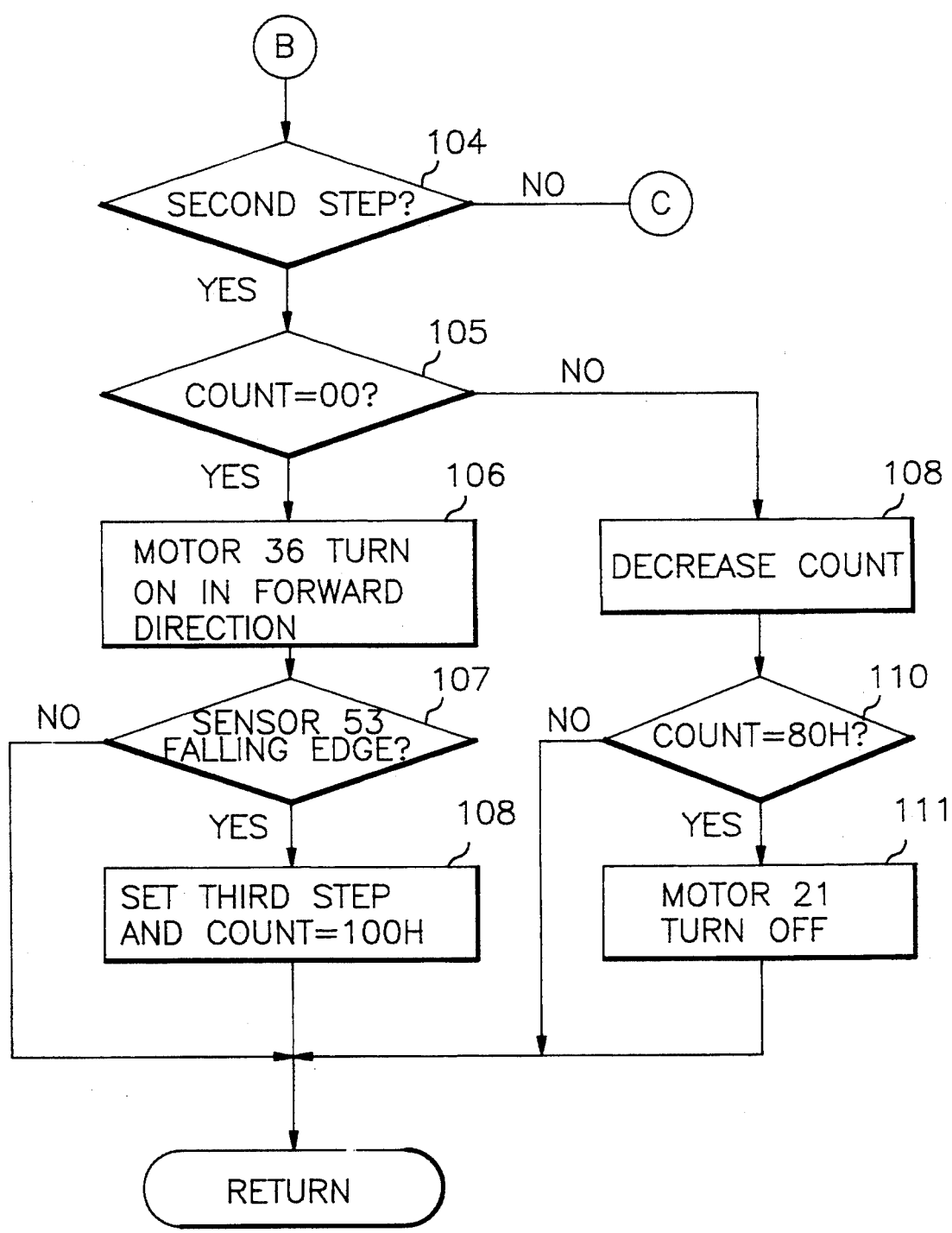

Referring to FIG. 9, the loading routine i.e., the first control mode is disclosed in detail. In FIG. 9a, when the first control mode is performed for the first time, the first flag and the first step are set to "H" (step 97 and 98). Then, the motor 21 is turned on in the forward direction (step 99). For the next operation, the program determines whether or not the first step is set (step 101). If not, the program continues to FIG. 9b. If the first step is set and the current state of the sensor 56 is rising edge (Z2 of FIG. 6), the second step is set and the count of the software counter is set to 100 H (step 102 and 103).

In FIG. 9b, if the second step is set, the program determines whether or not the count of the software counter is 0 (step 105). If so, the motor 36 is turned on in the forward direction and if not, program is continued to step 109. In step 107, the program determines whether or not the current state of the sensor 53 is falling edge. If the current state of the sensor 53 is falling edge (Z5 of FIG. 6), the third step is set and the count of software counter is 100 H (step 108). In step 109, the count is decreased one by one and then the program determined whether or not the count is 80 H (step 110). If the count is 80 H, the motor 21 is turned off.

Figure 9C:
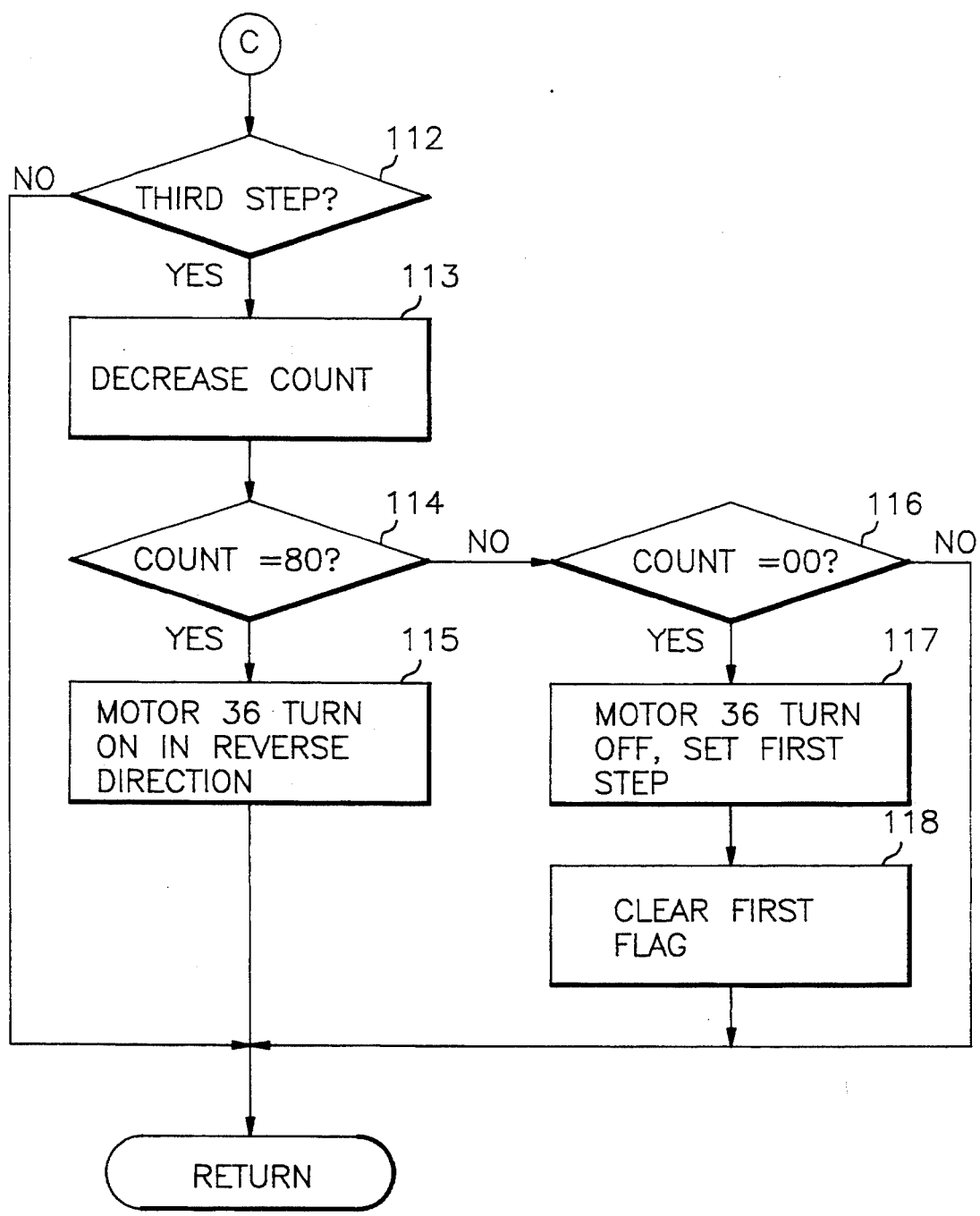

The program now continues to FIG. 9c wherein it is determined whether or not the third step is currently set (step 112). If the third step is set, the count is decreased one by one (step 113). In step 114, when the count is currently 80 H, the motor 36 is turned on in reverse direction (step 115). If the count is not 80 H, it is determined whether or not the counter is 0 (step 116). If the count is 0, the motor 30 is turned off and the first step is set (step 117). Then, the first flag is cleared as logic "L" (step 118).

As may be seen from the above, one of the stacked cassettes is dropped onto the bottom surface 16 of the cassette changing apparatus 100 by the rotation of the cassette feeding device and then the dropped cassette is inserted into the access opening 210 of the VCR 200 by the forward drive of the inserting and extracting device 30. After the cassette is inserted, the inserting and extracting device 30 is positioned at a predetermined distance from the access opening by the reverse drive of the insert/extract motor 36, thereby allowing the speedily extracting operation.

Referring now to FIG. 10, the unloading routine, i.e., the second control mode is disclosed.

In FIG. 10a, when the first control mode is performed for the first time, the first flag and the first step is set, and count is set to 100 H (step 119, and 120). Then, the solenoid 39 is turned on and the motor 33 is turned on in forward direction (step 121). If the first flog is "H" for the next operation, it is determined whether or not the first step is set (step 122). If the first step is set, it is determined whether or not the count is 0 (step 123). If the count is 0, the motor 33 is turned on in the reverse direction (step 124). Then, it is determined whether the current state of the sensor 56 is rising edge (step 125). If the rising edge state of the sensor 56 (Z11 of FIG. 6) is detected, the second step is set and the solenoid is turned on (step 126).

If the count is not 0, the count is decreased one by one (step 127). Then, it is determined whether or not the counter is 80 H (step 128). If so, the motor 33 is turned off (step 129) and if not, it is determined whether or not the count is 40 H (step 130). If the count is 40 H, the solenoid valve is turned off (step 130). In the other case, program returns to step 80 shown in FIG. 7.

Figure 10B:
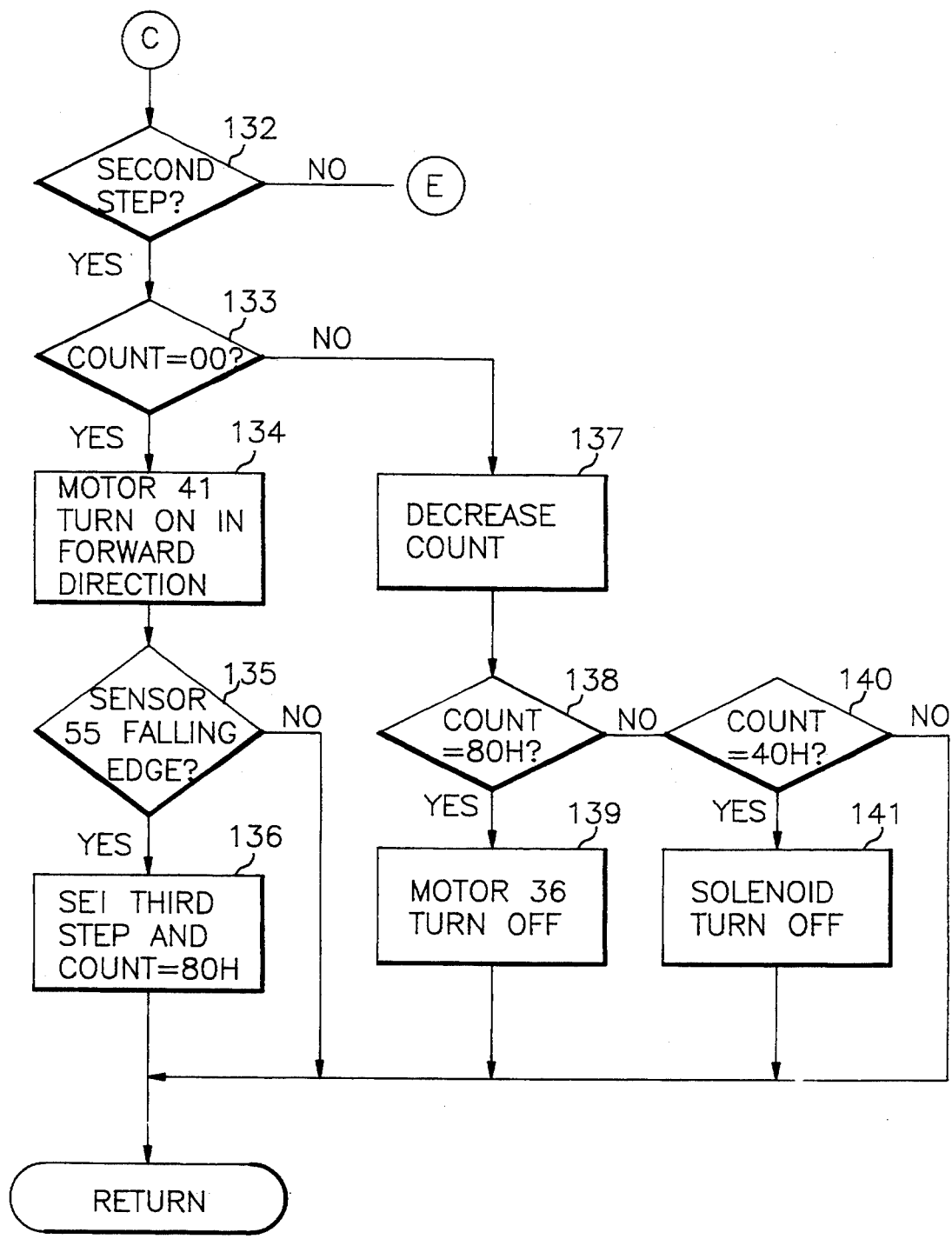

In FIG. 10b, if the operation step is the second step, it is determined whether or not the count is 0 (step 133). If so, the motor 41 is turned on in the forward direction (step 134) and if not, program is transferred to step 137. Then, in step 135, it is determined whether or not the current state of sensor 55 is falling edge (Z16 of FIG. 6). If so, the third step is set and the count is set to 80 H (step 136). If the count is not 0, the count is decreased one by one (step 137). Then, it is determined whether or not the count is 80 H (step 138). If so, the motor 36 is turned off (step 139). If not, it is determined whether or not the count is 40 H (step 140). If so, the solenoid is turned off (step 141).

Figure 10C:
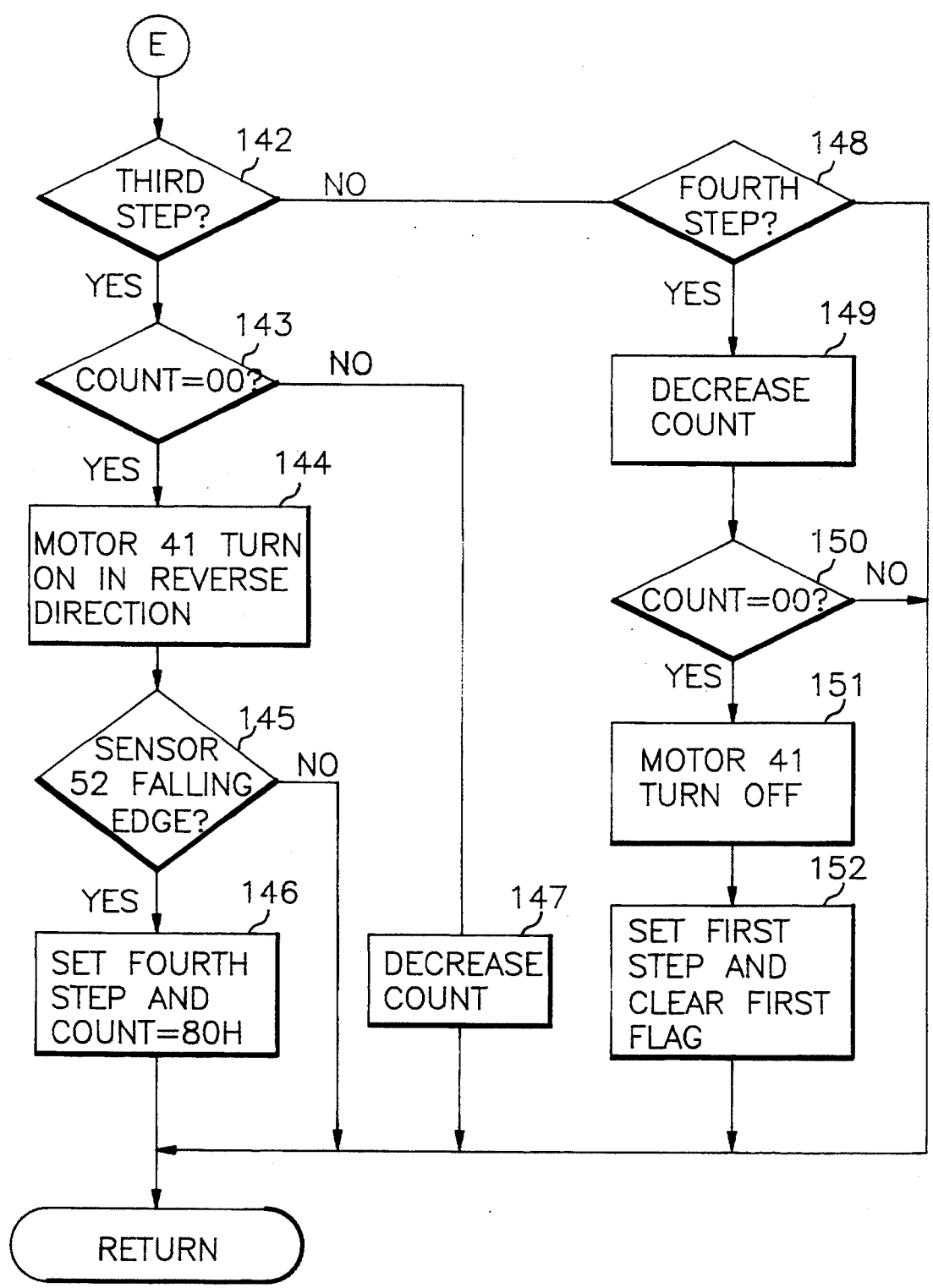

In FIG. 10c, if the operation step is the third step (step 142), it is determined whether or not the count is 0 (step 143). If so, the motor 41 is turned on in the reverse direction (step 144) and if not, the count is decreased one by on (step 147). Then, it is determined whether or not the current state of the sensor 52 is falling edge (Z18 of FIG. 6) (step 145). If so, the fourth step is set and the count is set to 80 H (step 146).

If the current operation step is the forth step (step 148), the count is decreased one by one (step 149). Then, it is determined whether or not the count is 0 (step 150). If so, the motor 41 is turned off and the first step is set and the first flay is cleared as logic "L" (step 152).

As may be seen from the above, the control device serves to actuate the inserting and extracting device to cause cassette ejected from VCR to unload from VCR and to actuate the cassette discharging device to allow the recorded or reproduced cassette to be discharged outward of the cassette exchanging device.

While the present invention has been shown and described with reference to the particular embodiments, it will be apparent to those skilled in the art that many changes and modifications may be made without departing from the spirit and scope of the invention as defined in the appended claims.

What is claimed is:

1. An automatic video-tape cassette changer for use with a recording and reproducing apparatus having a cassette loading mechanism for loading a video-tape cassette thereinto and ejecting the video-tape cassette therefrom, which comprises:

a main body having a rectangular-shaped open space wherein a plurality of cassettes are stacked on the open space and are to be dropped on a bottom surface thereof, a cassette entering inlet located in the vicinity of and parallel to a cassette access opening of said apparatus at rear wall of the main body and communicating with the open space and the cassette access opening, a cassette discharging outlet formed on the side wall of the main body through which a cassette is discharged outwardly from the open space of the main body, and projecting pieces adapted for supporting and guiding the stacked cassettes to the open space;

a stack photo-electric sensor located at the side wall associated with a first drive means for detecting a lowermost cassette of the stacked cassettes and generating a first cassette detection signal;

a feed photo-electric sensor located in the vicinity of the bottom surface for detecting a cassette in the open space and generating a second cassette detection signal;

an ejection photo-electric sensor located at the cassette entering inlet for detecting a recorded or reproduced cassette ejected from the apparatus and generating a third cassette detection signal;

a discharge photo-electric sensor located at the cassette discharging outlet for detecting a discharged cassette and generating a fourth cassette detection signal;

a start switch for generating a start signal;

first drive means located at side walls of the main body for dropping the lowermost cassette of the stacked cassettes into the open space one at a time in response to a first control signal;

second drive means, in response to a second control signal, for carrying the dropped cassette to a loading position, thereby enabling the dropped cassette to be loaded into the apparatus through the cassette entering inlet and the cassette access opening, and, in response to a third control signal, for extracting the cassette unloaded from the cassette access opening into the open space; and third drive means, in response to a fourth control signal, for discharging the extracted cassette outwardly from the open space through the cassette discharging outlet;

microprocessor means, in response to the start signal or a combination of the first and fourth cassette detection signals, for generating the first control signal; in response to the second cassette detection signal, for generating the second control signal; in response to the third cassette detection signal for generating the third control signal; and, in response to a combination of the third and the second cassette detection signals, for generating the fourth control signal.

* * * * *